United States Patent [19]
Groff et al.

[11] Patent Number: 5,906,485
[45] Date of Patent: May 25, 1999

[54] TUNNEL-TYPE CONVEYOR OVEN HAVING TWO TYPES OF HEAT SOURCES

[75] Inventors: E. Terry Groff, Wernersville; Joseph S. Zaleski, Jr., Mohrsville; Michael W. Cox, Lebanon; Vincent G. Pasquini, Palmyra, all of Pa.

[73] Assignee: Reading Pretzel Machinery Corporation, Robesonia, Pa.

[21] Appl. No.: 09/032,134

[22] Filed: Feb. 27, 1998

[51] Int. Cl.$^6$ .................................................. F27B 9/36
[52] U.S. Cl. ...................... 432/121; 432/146; 432/175; 432/209
[58] Field of Search .................................. 432/120, 121, 432/146, 148, 175, 202, 209, 8, 59, 72, 176

[56] References Cited

U.S. PATENT DOCUMENTS

| | | |
|---|---|---|
| 3,463,465 | 8/1969 | Fuller . |
| 3,494,305 | 2/1970 | Pachyn . |
| 3,581,679 | 6/1971 | Jansen et al. . |
| 3,718,322 | 2/1973 | Skelton . |
| 3,736,860 | 6/1973 | Vischer, Jr. . |
| 3,813,216 | 5/1974 | Baur et al. ................................ 432/202 |
| 3,830,624 | 8/1974 | Sperring et al. ......................... 432/145 |
| 3,970,072 | 7/1976 | Chipchase . |
| 4,050,885 | 9/1977 | Nowick et al. . |
| 4,115,050 | 9/1978 | Gerwin . |
| 4,217,090 | 8/1980 | Whike et al. ................................ 432/8 |
| 4,286,943 | 9/1981 | Petlak et al. . |
| 4,318,688 | 3/1982 | Buschulte et al. . |
| 4,369,027 | 1/1983 | Saito et al. . |
| 4,493,308 | 1/1985 | Hurley et al. . |
| 4,529,379 | 7/1985 | DiCastri ................................... 432/148 |
| 4,554,437 | 11/1985 | Wagner et al. ............................ 432/45 |
| 4,569,328 | 2/1986 | Shukla et al. . |
| 4,644,857 | 2/1987 | Buller-Colthurst . |
| 4,705,022 | 11/1987 | Collier . |
| 4,739,154 | 4/1988 | Bharara et al. . |

(List continued on next page.)

*Primary Examiner*—Teresa Walberg
*Assistant Examiner*—Gregory A. Wilson
*Attorney, Agent, or Firm*—Panitch Schwarze Jacobs & Nadel, P.C.

[57] ABSTRACT

A tunnel-type conveyor oven having two types of heat sources is provided. The oven includes a conveyor for carrying items through the oven along a conveyor path. The conveyor has first and second opposite sides. A plurality of radiant heaters are located transverse to and extend across the conveyor path. The radiant heaters are spaced apart in a direction of the conveyor path. Each radiant heater includes an inner tube having a wall with a plurality of openings defined therethrough, an open first end and a second end. A burner is directed into the open first end of the inner tube. An outer tube is located around the inner tube. The outer tube has an outer surface which is adapted to radiate heat, a first end and a second end. An exhaust outlet is located on the second end of the outer tube. The radiant heaters are arranged such that with every other heater, the burners are located on the first side of the conveyor, and with the remaining heaters, the burners are located on the second side of the conveyor for uniform radiant heat distribution across the conveyor. An exhaust manifold is connected to the exhaust outlet of at least one of the heaters. A penthouse chamber is located above the plurality of radiant heaters, and the exhaust manifold is connected to the penthouse chamber. A convection heating system is also provided which includes an upper convection heater located above and extending across the conveyor path. The upper convection heater has an upper plenum with supply areas located between each of the radiant heaters. The supply areas each have a plurality of openings directed toward the conveyor path. A lower convection heater is located below the conveyor path and includes a lower plenum having a plurality of openings directed toward the conveyor path. A convection air manifold is connected between the penthouse chamber and the upper and lower plenums to deliver the products of combustion from the radiant heaters collected in the penthouse chamber to the upper and lower plenums to provide convective heat along the conveyor path.

9 Claims, 2 Drawing Sheets

U.S. PATENT DOCUMENTS

| | | |
|---|---|---|
| 4,809,672 | 3/1989 | Kendall et al. . |
| 4,873,107 | 10/1989 | Archer . |
| 4,894,006 | 1/1990 | Cassagne et al. . |
| 4,951,648 | 8/1990 | Shukla et al. . |
| 5,016,610 | 5/1991 | Meguro et al. . |
| 5,224,542 | 7/1993 | Hemsath . |
| 5,241,949 | 9/1993 | Collier . |
| 5,279,278 | 1/1994 | Logtens et al. . |
| 5,586,547 | 12/1996 | Nixon . |
| 5,588,830 | 12/1996 | Josefsson et al. ............... 432/121 |
| 5,644,975 | 7/1997 | Bedford et al. . |

TUNNEL-TYPE CONVEYOR OVEN HAVING TWO TYPES OF HEAT SOURCES

BACKGROUND OF THE INVENTION

The present invention relates to conveyor ovens for continuously baking food products, and more particularly, to a tunnel-type conveyor oven having two types of heat sources for more efficient baking of the food products.

Tunnel-type ovens or kilns which are used in connection with commercial baking systems are generally known. The size and type of oven sections used in such commercial baking operations vary depending upon the types of products being produced and the quantity desired. The desired product texture, color and flavor play an important role in defining the type of oven sections used. For instance, radiant heat is used to raise a product's temperature without over drying, and can also provide a toasting effect when radiation is high enough. This allows control of the level of the product's moisture content which is important to the product's texture. Convection heating is used in to provide a balanced heat transfer and a uniform temperature for the product in the oven chamber. While some ovens are known which provide various types of heat, such as radiant oven sections and/or radiant/convection oven sections, it would be desirable to have the ability to provide adjustment to the types of heat being used in a single baking system to allow the most flexibility for producing different types of products.

In one known oven which is designed for use in high volume restaurant operations, such as for baking pizza, a tunnel-type conveyor oven is provided which includes forced hot air convection heat along with infrared strip heaters so that convective and radiant heating take place simultaneously. The heat inputs for convective and radiant heating are independently controlled. The infrared strip heaters each include a porous ceramic element burner which extends from a common side of the conveyor across the conveyor width. Convection heat ducts are located between the infrared strip heaters. The radiant burners are used in conjunction with ceramic plates or tiles which are heated by flames produced by the burners in order to produce radiant heat. The convection heater draws air from within the oven, as well as additional outside air, which is heated by an auxiliary burner and distributed through separate plenums located above and below the conveyor which extends through the tunnel oven.

It would be desirable to provide a combination radiant/convection tunnel oven which provides uniform heating across the width of the conveyor and which offers the flexibility of changing the ratio of radiant and convective heat that the product experiences.

SUMMARY OF THE INVENTION

Briefly stated, the present invention provides a tunnel-type conveyor oven having two types of heat sources. The oven includes a conveyor for carrying items through the oven along a conveyor path. The conveyor has first and second opposite sides. A plurality of radiant heaters are located transverse to and extend across the conveyor path. The radiant heaters are spaced apart in a direction of the conveyor path. Each radiant heater includes an inner tube having a wall with a plurality of openings defined therethrough, an open first end and a second end. A burner is directed into the open first end of the inner tube. An outer tube is located around the inner tube. The outer tube has an outer surface which is adapted to radiate heat, a first end and a second end. An exhaust outlet is located on the second end of the outer tube. The radiant heaters are arranged such that with every other heater, the burners are located on the first side of the conveyor, and with the remaining heaters, the burners are located on the second side of the conveyor for uniform radiant heat distribution across the conveyor. An exhaust manifold is connected to the exhaust outlet of at least one of the radiant heaters. A penthouse chamber is located above the plurality of radiant heaters, and the exhaust manifold is connected to the penthouse chamber. A convection heating system is also provided which includes an upper convection heater located above and extending across the conveyor path. The upper convection heater has an upper plenum with supply areas located between each of the radiant heaters. The supply areas each have a plurality of openings directed toward the conveyor path. A lower convection heater is located below the conveyor path and includes a lower plenum having a plurality of openings directed toward the conveyor path. A convection air manifold is connected between the penthouse chamber and the upper and lower plenums to deliver the products of combustion from the radiant heaters collected in the penthouse chamber to the upper and lower plenums to provide convective heat along the conveyor path.

BRIEF DESCRIPTION OF THE SEVERAL VIEWS OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
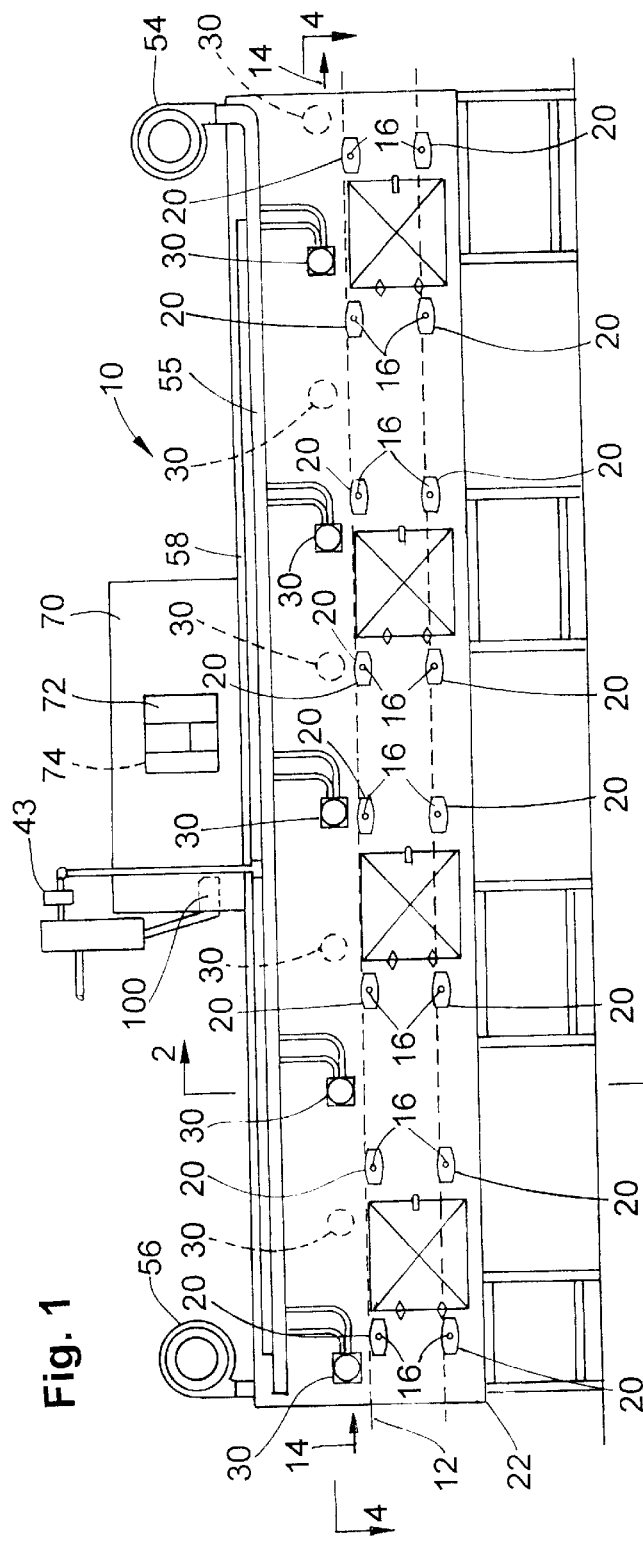
FIG. 1 is a front elevational view of a tunnel-type conveyor oven in accordance with a preferred embodiment of the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the tunnel-type conveyor oven in accordance with the present invention and designated parts thereof. The terminology includes the words above specifically mentioned, derivatives thereof and words of similar import.

Referring to the drawings, wherein the same reference numerals are used to indicate the same elements throughout, there is shown in FIG. 1 a preferred embodiment of a tunnel-type conveyor oven 10 having two types of heat sources in accordance with the present invention. The conveyor oven 10 includes a conveyor 12 for carrying items (not shown) through the oven 10 along a conveyor path 14. The conveyor 12 may be formed of links or a high temperature band belt, and is preferably supported by a plurality of rollers 16. It will be recognized by those skilled in the art from the present disclosure that the conveyor 12 may extend only through the tunnel-type conveyor oven 10 of the present invention having two types of heat sources, in which case a drive system (not shown) for the conveyor 12 would be required, or may be a portion of a larger conveyor which extends through several heating modules (not shown), such as the type used in commercial bakeries for various baked goods, such as pretzels. The rollers 16 are preferably rotatably supported by bearing blocks 20 located on the oven housing 22. In the preferred embodiment, the oven 10 is a module used in connection with other heating modules in commercial bakeries.

As shown in FIGS. 1–5, a plurality of radiant heaters 30 are located transverse to and extend completely across the conveyor path 14. The radiant heaters 30 are preferably spaced apart approximately three (3) feet in the direction of the conveyor path 14. However, it will be recognized by those skilled in the art from the present disclosure that the spacing of the radiant heaters 30 can be varied, if desired, depending on the size and speed of the oven, and the volume of products to be baked. As shown in detail in FIG. 3, each radiant heater 30 includes a inner tube 32 having a wall 33 with a plurality of openings 37 defined therethrough, and an open first end 34 and a second end 36. A burner 38 is directed into the open first end 34 of the inner tube 32. Preferably, the burner 38 includes an ignitor (not shown) and a mixing chamber for mixing gas and air represented by arrows 42, 44 respectively in FIG. 3. Gas burners 38 of this type are generally well known in the art, and accordingly, further description is not believed to be necessary or limiting.

Preferably, the inner tube 32 is made of inconel, chromium nickel alloys or any other metal alloy or material capable of withstanding high burner operating temperatures of approximately 2000° F. in the inner tube 32. In the preferred embodiment, the inner tube 38 includes five hundred (500) openings 37 which are approximately ¼ inch in diameter and are generally evenly distributed on the surface of the inner tube 32. The sizes of the holes are varied across the inner tube 32 from the first end 34 to the second end 36 to balance the heat distribution of the radiant heater 30, as explained in detail below. The second end 36 of the inner tube is preferably closed. It will be recognized by those skilled in the art that the number, size, spacing and locations of the openings 37 in the inner tube 32 can be varied, if desired.

Figure 3:
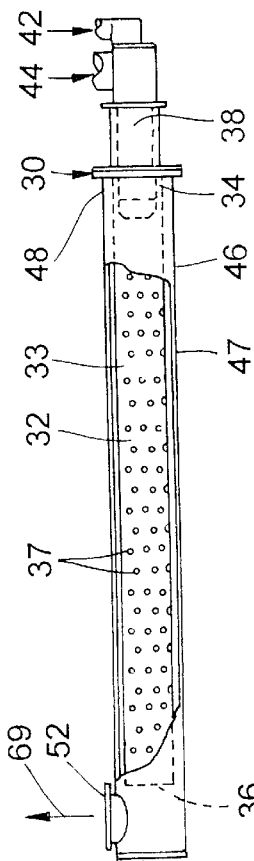
FIG. 3 is a greatly enlarged view of a radiant heater used in the tunnel-type conveyor oven in accordance with the present invention.

Still with reference to FIG. 3, an outer tube 46 is located around the inner tube 32. The outer tube 46 has an outer surface 47 which is adapted to radiate heat, a first end 48 which is connected to the first end 34 of the inner tube 32, and a second end 50 with an exhaust outlet 52 located thereon. Preferably, the first end 48 includes a flanged connection for attachment to the first end 34 of the inner tube 32. In the preferred embodiment, the outer tube 46 has a six inch diameter and is made from stainless steel. However, it will be recognized by those skilled in the art from the present disclosure that any desired tube sizes could be used for the inner and outer tubes 32, 46, and that the outer tube 46 could be made of any suitable material which can withstand the high operating temperatures and has good heat radiation characteristics.

Preferably, the each radiant heater 30 is balanced to provide a generally uniform surface temperature gradient between the first and seconds 48, 50 of the outer tube 46. This is accomplished by assembling the radiant heater 30 with the inner tube 32 within the outer tube 46 and attaching thermocouples (not shown) at intervals between the first and second ends 48, 50 of the outer tube 46. Air and gas are supplied to the burner 38 at relatively constant pressure, and the burner 38 is ignited. The temperature profile along the length of the outer tube 46 is obtained, which after the initial test with uniform ¼ inch openings 37 evenly distributed over the surface of the inner tube 32 showed a temperature gradient with the highest temperature being toward the second end 50 of the outer tube 46. The radiant heater 30 was then shut down and disassembled, and the size of the openings 37 in the low temperature areas, generally toward the second end 36 of the inner tube 32 were increased incrementally such that the openings 37 toward the second end 34 of the inner tube 32 have a greater size. The radiant heater 30 was then reassembled and tested again using thermocouples located at intervals along the outer tube 46. This iterative testing and adjustment to the size of the openings 37 was repeated until the temperature gradient from the first end 48 to the second end 50 of the outer tube 46 was within about five percent (5%) or 100° F. at the maximum operating temperature of 1800–2000° F. Generally, more open area (larger diameter openings 37) was required in the inner tube 32 per unit of surface area of the inner tube 32 toward the second end 34 in order to distribute more heat to the second end of 50 of the outer tube. This balancing is generally adequate even when less radiant heat is desired since the airflow to the burners 38 is approximately constant, and only the gas flow is varied in order to vary the amount of radiant heat being produced. This balancing of the radiant burners 30 can be easily carried out by those of ordinary skill in the art without undue experimentation, and will vary depending upon the size and shape of the inner tube 32 and the outer tube 46, as well as the flow rate of air and gas through the burner 38. It will be similarly understood by those skilled in the art from the present disclosure that the openings 37 need not be circular holes, but may be of any desired shape.

Figure 4:
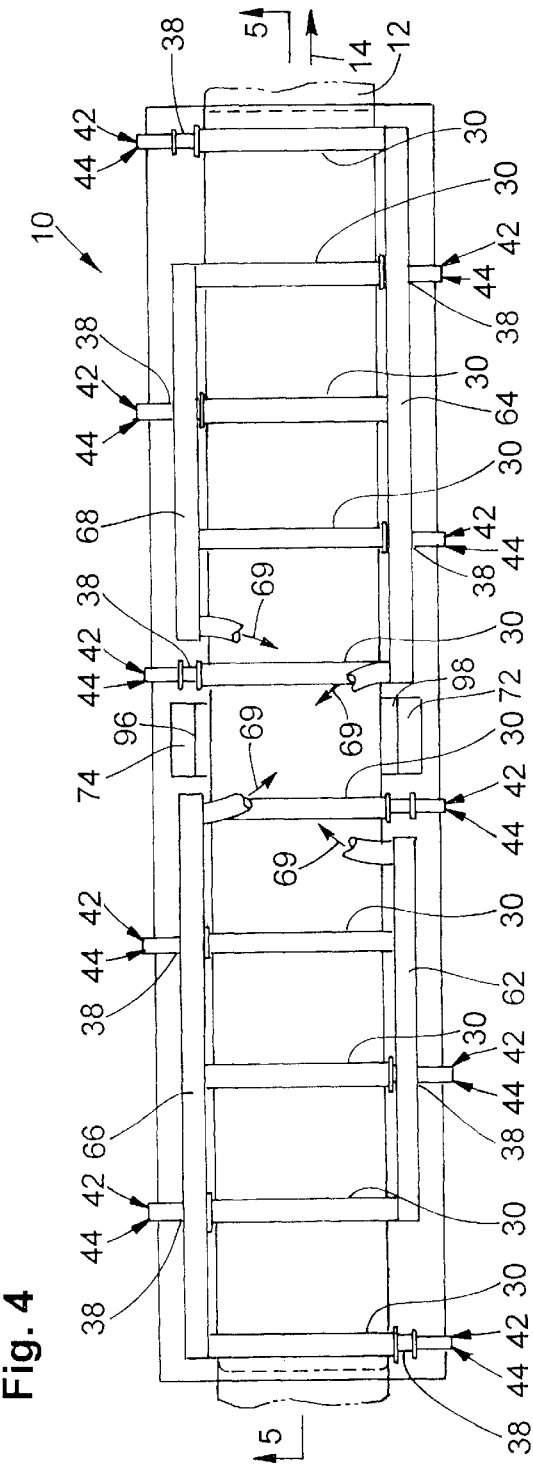
FIG. 4 is a cross-sectional view of the tunnel-type conveyor oven in accordance with the present invention taken along lines 4—4 in FIG. 1.

As shown in detail in FIG. 4, the radiant heaters 30 are arranged such that with every other heater 30, the burners 38 are located on the first side of the conveyor 12, and with the remaining heaters 30, the burners 38 are located on the second side of the conveyor 12 for uniform radiant heat distribution across the conveyor 12. By alternating the arrangement of the radiant heaters 30, the individual temperature gradients across each radiant heater 30 are equalized along the length of the conveyor path 14, providing more even baking for products distributed across the conveyor 12. In the illustrated embodiment, ten radiant heaters 30 are provided. However, it will be recognized by those skilled in the art from the present disclosure that the number of radiant heaters 30 can be varied, depending upon the size of the oven 10 and the volume of products to be processed through the oven 10.

As shown in FIG. 1, the radiant heaters 30 are fed air from two combustion blowers 54, 56 which provide a constant air flow. One combustion blower 54 is located on the first side of the conveyor 12, and feeds an air manifold 55, shown in FIGS. 1 and 2, which is connected to each burner 38 located on the first side of the conveyor 12 in order to provide air (represented by arrows 44 in FIG. 5) for combustion. A similar air manifold 57 which is connected to the second blower 56 is provided on the second side of the conveyor 12, as shown in FIG. 2.

Figure 2:
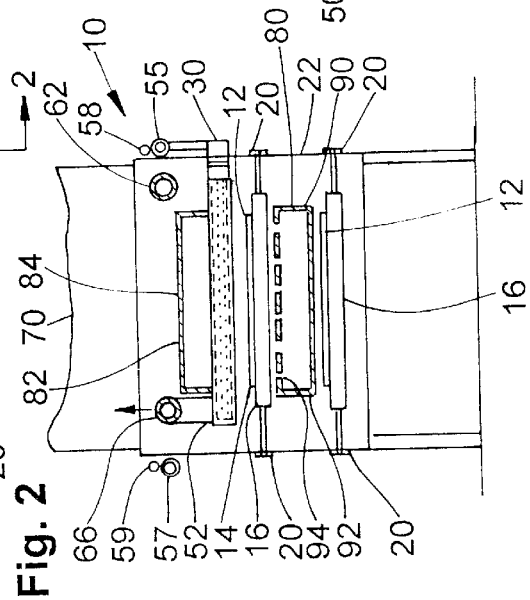
FIG. 2 is a cross-sectional view taken along lines 2—2 in FIG. 1.

Gas (represented by arrows 42 in FIG. 3), such as propane, is also fed to the burners 38 via pipes 58 and 59 located on either side of the conveyor 12, as shown in FIG. 2. The gas pipes 58, 59 preferably are connected to a single manifold and metered automatically by a regulating valve 43, as shown in FIG. 1, controlled by an electrical actuator (not shown). The rate of gas flow is controlled by the valve 43 which can be set at a very low feed rate such that the radiant heaters 30 provide only twenty percent (20%) of the total heat for the oven 10, or at a higher flow rate such that the radiant heaters 30 provide 80% or more of the heat to the oven 10. The regulating valve 43 can also be adjusted to provide any desired percentage of radiant heat from twenty to eighty percent (20–80%) of the total heat provided by the oven 10. Preferably, orifice plates (not shown) are provided in the housings of the burners 38 to meter the fuel to the burners evenly. However, it will be recognized by those skilled in the art from the present disclosure that orifice plates or other types of metering devices can be used in the feed pipes 58, 59 or the burners 38, if desired. In the preferred embodiment, the gas pressure must maintain at least a three inch pressure drop across the orifice plates in order to ensure balance between the entire zone. While the preferred arrangement of the air and gas feeds 55, 57, 58, 59 have been described, it will be recognized by those skilled in the art from the present disclosure that any other type of feed arrangement for gas and air or any other type of fuel can be utilized, if desired.

Referring now to FIGS. 2–4, at least one exhaust manifold 62 is connected to the exhaust outlet 52 of at least one of the radiant heaters 30, and preferably, four exhaust manifolds 62, 64, 66 and 68 are connected to the exhaust outlets 52 of the radiant heaters 30, as shown in FIG. 4, on both sides of the conveyor 12 in order to capture the exhaust gases and products of combustion from the burners 38. Preferably, the exhaust manifolds 62, 64, 66, 68 are made of stainless steel or another type of metal or other material capable of withstanding the exhaust temperature. The exhaust manifolds 62, 64, 66, 68 pass the exhaust gases and products of combustion, represented as arrows 69 in FIG. 3, to the penthouse chamber 70.

Figure 5:
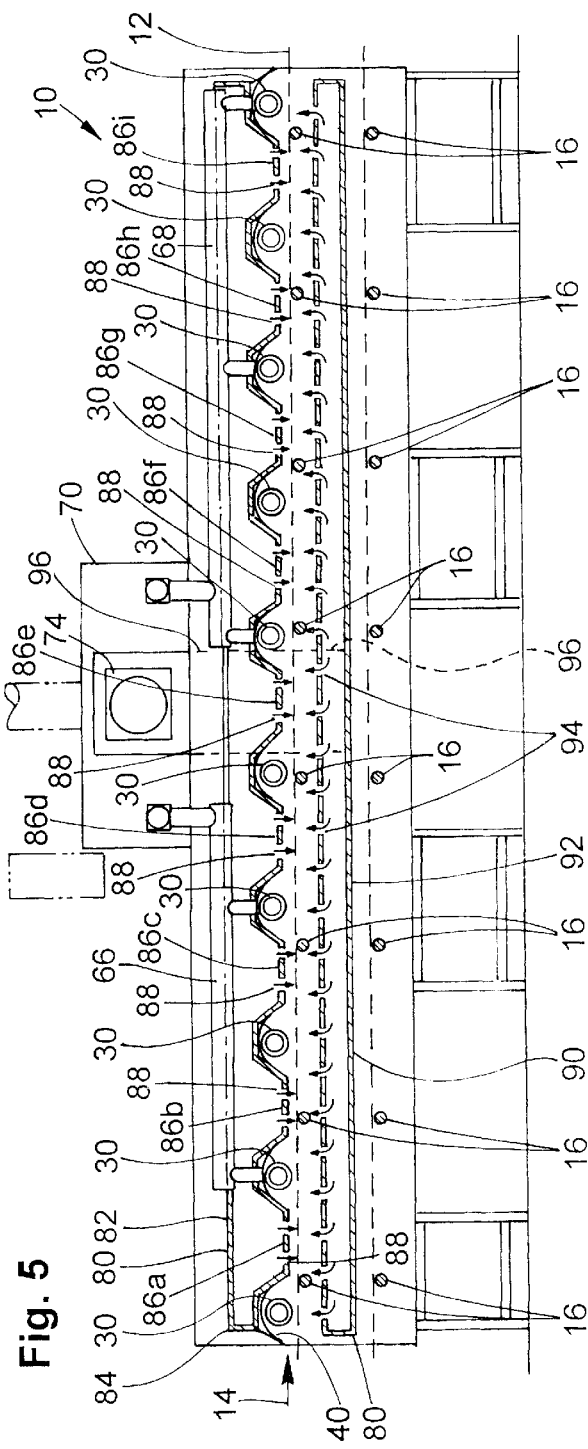
FIG. 5 is a cross-sectional view of the tunnel-type conveyor oven in accordance with the present invention taken along lines 5—5 in FIG. 4.

As shown in FIGS. 1 and 5, a penthouse chamber 70 is located above the plurality of radiant heaters 30, and preferably on top of the oven 10. The exhaust manifold 62, and preferably all of the exhaust manifolds 62, 64, 66, 68, are connected to the penthouse chamber 70 which collects the heated exhaust gases and products of combustion from the radiant heaters 30. The penthouse chamber 70 is preferably made of stainless steel or any other material which is capable of withstanding the high temperatures of the exhaust gas from the radiant heaters 30. The penthouse chamber 70 is located above the radiant heaters 30. This allows the natural convection of the heated gases to assist in the movement of the exhaust gas to the penthouse chamber 70. However, the movement of exhaust gasses to the penthouse chamber 70 is achieved mainly by the negative pressure created from blowers 72, 74, shown in FIGS. 1, 4 and 5, which are used to distribute the exhaust gases and products of combustion to a convection heating system 80, described in more detail below.

Referring now to FIGS. 2 and 5, a convection heating system 80 is provided which includes an upper convection heater 82 located above and extending across the conveyor path 14. The upper convection heater 82 includes an upper plenum 84 with generally rectangularly shaped supply areas 86a–86i located between the radiant heaters 30, as shown in FIG. 5. The supply areas 86a–86i each have a plurality of openings 88 directed toward the conveyor path 14.

The convection heating system 80 also comprises a lower convection heater 90 which is located below the conveyor path 14. The lower convection heater 90 includes a lower plenum 92 having a plurality of openings 94 directed toward the conveyor path 14. Preferably, the upper and lower plenums 84, 92 are spaced approximately 5 inches from the baking band defined by the surface of the conveyor 12. The supply areas 86a–86i of the upper plenum 84 are preferably spaced between the radiant heaters 30 and are approximately 24 inches in length. Preferably, the upper and lower plenums 84, 92 are formed from stainless steel sheet metal. However, it will be recognized by those skilled in the art from the present disclosure that other suitable materials may be used, if desired.

At least one convection air manifold 96, and preferably two convection air manifolds 96, 98 are connected between the penthouse chamber 70 and the upper and lower plenums 84, 92. Preferably, one convection air manifold 96 is located on the first side of the conveyor 12 and is connected to a third blower 72 to direct the exhaust gas and products of combustion collected in the penthouse chamber 70 to the upper plenum 84. The second convection air manifold 98 is connected to a fourth blower 74 which is located on the second side of the conveyor 12. The fourth blower 74 draws exhaust gases and products of combustion 69 collected in the penthouse chamber 70 to the lower plenum 92 for distribution.

As shown in FIG. 1, a supplemental burner 100 is provided in the penthouse chamber 70 to provide additional heat to the air and gases collected in the penthouse chamber 70. The supplemental burner 100 is preferably thermostatically controlled to raise the temperature of the oven chamber around the conveyor path 14. An outside air inlet (not shown) may also be provided to draw additional fresh air into the penthouse chamber 70.

In order to control the percentage of convention heat being provided to the oven chamber around the conveyor path 14, the speed of the third and fourth blowers 72, 74 can be varied from between 50% to 100% of the rated capacity. The supplemental burner 100 is regulated based on a thermostat (not shown) located in the oven chamber of the oven 10, and the rate of firing of the supplemental burner 100 is increased or decreased in order to maintain a desired temperature level.

Ducts (not shown) may be provided for collecting the convection air which has been discharged through the upper plenum 84 and the lower plenum 92. The ducts preferably discharge a portion of the convection air from the oven chamber through an exhaust outlet (not shown) which is controlled by a separate exhaust fan (not shown). The remainder of the collected convection air can be recirculated back to the penthouse 70.

Preferably, reflectors 40 are provided over each radiant heater 30 in order to more efficiently reflect radiant heat downwardly toward the conveyor path 14. The reflectors 40 are preferably made of polished stainless steel. However, it will be recognized by those skilled in the art from the present disclosure that they may be made of any other suitable material, if desired.

The tunnel-type convection oven 10 in accordance with the present invention is capable of being adjusted to provide a desired amount of radiant heat and a desired amount of convective heat to articles or products being carried along the conveyor path 14. The level of the radiant heaters 30 is adjustable to provide between 20% and 80% of the heat for the oven 10 by varying the amount of gas being supplied to the burners 38. The remaining portion of the heat for the oven 10 is supplied by the convection heating system 80, which is also independently variable to provide a desired level of convective heating based on the speed of the blowers 72, 74, and the set point of the thermostat which controls the supplemental heater 100. This allows the same oven 10 to be used for producing batches or runs of different products which require totally different heating characteristics. For example, a high level of radiant heat from the radiant heaters 30 can be used to produce products having a toasted surface. For a run of a different product, the oven 10 of the present invention can be adjusted such that the majority of the heat is convective heat. The total heating is accomplished more efficiently by capturing waste heat from the radiant heater exhaust for use by the convection heater. Preferably, the radiant heaters 30 are adapted to produce 20,000 to 200,000 BTU/HR. However, the output of the radiant heaters 30 can be varied to any desired amount depending upon the size of the oven 10 and the volume of products to be processed through the oven 10. The air velocity from the openings 88, 94 from the upper and lower plenums 84, 92 of the convection heating system 80 is adjustable from near zero to a predetermined maximum, depending upon the speed of the blowers 72 and 74.

In use, the amount of radiant heat and convection heat provided by the radiant heaters 30 and the convection heating system 80 can be adjusted in order to achieve the desired baking characteristics and properties which are not normally achievable with only one type of heat source. Additionally, due to the alternating arrangement of the radiant heaters 30, temperature gradients across the width of the conveyor 12 are minimized.

It will be appreciated by those skilled in the art that changes can be made to the embodiments described above without departing from the broad inventive concept. It is understood, therefore, that this invention is not limited to the particular embodiment disclosed, but it is intended to cover modifications within the spirit and scope of the present invention.

We claim:

1. A tunnel-type conveyor oven having two types of heat sources, comprising:
    a conveyor for carrying items through the oven along a conveyor path, the conveyor having first and second opposite sides;
    a plurality of radiant heaters located transverse to and extending across the conveyor path, and being spaced apart in a direction of the conveyor path, each radiant heater including,
        an inner tube having a wall with a plurality of openings defined therethrough, an open first end and a second end,
        a burner directed into the open first end of the inner tube, and
        an outer tube located around the inner tube, the outer tube having an outer surface adapted to radiate heat, a first end and a second end with an exhaust outlet located on the second end;
    the radiant heaters being arranged such that with every other heater, the burners are located on the first side of the conveyor and with the remaining heaters, the burners are located on the second side of the conveyor for uniform radiant heat distribution across the conveyor;
    an exhaust manifold connected to the exhaust outlet of at least one of the heaters;
    a penthouse chamber located above the plurality of radiant heaters, the exhaust manifold being connected to the penthouse chamber;
    a convection heating system including,
        an upper convection heater located above and extending across the conveyor path, the upper convection heater having an upper plenum with supply areas located between each of the radiant heaters, the supply areas each having a plurality of openings directed toward the conveyor path,
        a lower convection heater located below the conveyor path and including a lower plenum having a plurality of openings directed toward the conveyor path,
        a convection air manifold connected between the penthouse chamber and the upper and lower plenums to deliver the products of combustion from the radiant heaters collected in the penthouse chamber to the upper and lower plenums to provide convective heat along the conveyor path.

2. The tunnel-type conveyor oven of claim 1 wherein each of the inner tubes is made of a chromium nickel alloy.

3. The tunnel-type conveyor oven of claim 1 wherein an auxiliary burner is located in the penthouse chamber to increase the temperature of air and products of combustion from the radiant heaters located in the penthouse chamber.

4. The tunnel-type conveyor oven of claim 3 wherein the air velocity from the openings in the upper and lower plenums are adjustable from zero to a predetermined maximum velocity.

5. The tunnel-type conveyor oven of claim 1 wherein the openings in the wall of the inner tube have a greater open area per unit area of the inner tube adjacent to the second end of the inner tube to achieve a balanced heat gradient.

6. The tunnel-type conveyor oven of claim 1 wherein the radiant heaters are adjustable to provide from 20% to 80% of the heat for the oven, with the remaining portion of the heat for the oven being supplied by the convection heating system.

7. The tunnel-type oven of claim 1 wherein reflectors are located over each radiant heater to direct radiant heat toward the conveyor path.

8. The tunnel-type oven of claim 1 wherein there are ten radiant heaters spaced approximately three feet apart.

9. The tunnel-type oven of claim 1 wherein the burners for the radiant heaters on first side of the conveyor are each connected to a first combustion air supply manifold, and the burners for the radiant heaters on the second side of the conveyor are each connected to a second combustion air supply manifold, each combustion air supply manifold being adapted to provide a constant volume of air to the respective burners, and the burners of the radiant heaters are each connected to a gas supply manifold which is adapted to be connected to gas source.

* * * * *